(12) United States Patent
Nelson et al.

(10) Patent No.: US 8,793,509 B1
(45) Date of Patent: Jul. 29, 2014

(54) WEB AUTHORIZATION WITH REDUCED USER INTERACTION

(75) Inventors: Jeffrey Nelson, Mountain View, CA (US); Jonathan S. Sergent, Palo Alto, CA (US); Mark B. Stahl, Jersey City, NJ (US); Shyam Sheth, Toronto (CA); Jun Yang, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1250 days.

(21) Appl. No.: 12/030,095

(22) Filed: Feb. 12, 2008

(51) Int. Cl.
  *G06F 11/30* (2006.01)
  *G06F 12/14* (2006.01)

(52) U.S. Cl.
  USPC .......................................... 713/193; 380/227

(58) Field of Classification Search
  USPC .................................................. 713/170, 193
  See application file for complete search history.

(56) References Cited

U.S. PATENT DOCUMENTS

2005/0144452 A1* 6/2005 Lynch et al. ................... 713/170
2005/0254514 A1* 11/2005 Lynn .............................. 370/450

OTHER PUBLICATIONS

Collin Jackson; Secure CrossDomain Communication for Web Mashups; Year:2007; Microsoft Research; pp. 1-10.*

'Google Developers' [online]. "Authentication for Web Applications," Aug. 16, 2013, [retrieved on Jan. 2, 2014]. Retrieved from the Internet: URL:http://code.google.com/apis/accounts/AuthForWebApps.html. 1 page.
'Yahoo!: Developer Network' [online]. "Authentication and Authorization with Yahoo!" [retrieved on Jan. 2, 2014]. Retrieved from the Internet: URL:http://developer.yahoo.com/auth/ 1 page.
'Microsoft Developer Network' [online]. "Windows Live Data SDK—Alpha 1.0," [retrieved on Jan. 2, 2014]. Retrieved from the Internet: URL:http://msdn2.microsoft.com/en-us/library/bb447720.aspx 1 page.
'OAuth Core Workgroup' [online]. "OAuth Core 1.0," Dec. 4, 2007, [retrieved on Jan. 2, 2014]. Retrieved from the Internet: <URL:http://oauth.net/core/1.0/>, 13 pages.

* cited by examiner

*Primary Examiner* — Mohammad W Reza
*Assistant Examiner* — Monjour Rahim
(74) *Attorney, Agent, or Firm* — Fish & Richardson P.C.

(57) ABSTRACT

The subject matter of this specification can be embodied in, among other things, a method that includes receiving, from a web browser, a request for a token that authorizes a third party server to access a user's data stored by a content provider server. The token specifies a first scope of authorization that indicates a portion of the user's data that the third party server is permitted to access. The method also includes determining if the first scope is substantially the same as or a subset of a second scope of a previously issued token and transmitting the token in response to the received request if the first scope is determined to be substantially the same as or a subset of the second scope.

25 Claims, 10 Drawing Sheets

WEB AUTHORIZATION WITH REDUCED USER INTERACTION

TECHNICAL FIELD

This instant specification relates to authenticated communications.

BACKGROUND

A popular approach to building web applications includes combining content from more than one source into an integrated experience. Such combinations may be referred to as "mashups." For example, a mashup of a web application, such as GOOGLE Maps, with another web application containing images from a natural disaster, can enhance the experience of both types of web applications.

Some web applications can store private user data on behalf of the user. For example, GOOGLE GMAIL stores e-mail messages, PICASA stores images, and GOOGLE Maps stores personalized maps. Many web applications do not permit the sharing of private user data with third parties, which may limit a mashup designer's ability to construct a mashup when private user data is involved.

When the use of private user data is permitted in third party applications, a user may receive a request to authorize the use. The user may receive this request multiple times if the user uses different computing devices to access a third party application that incorporates the user's private data. Additionally, the user may receive multiple requests to authorize use of the user's private data if the requested use varies from previously authorized uses.

SUMMARY

In general, this document describes secured communications that reduce a number of user interactions in an authorization process.

In a first general aspect, a computer-implemented method is described. The method includes receiving, from a web browser, a request for a token that authorizes a third party server to access a user's data stored by a content provider server. The token specifies a first scope of authorization that indicates a portion of the user's data that the third party server is permitted to access. The method also includes determining if the first scope is substantially the same as or a subset of a second scope of a previously issued token and transmitting the token in response to the received request if the first scope is determined to be substantially the same as or a subset of the second scope.

In a second general aspect, a system is described. The system includes an interface to receive from a web browser a request for a token having a first scope that authorizes a third party to access a user's data, means for determining whether the first scope is substantially equal to or less than a second scope associated with a previously issued token, and a token issuer to transmit the token in response to the received request for the token if the first scope is determined to be substantially equal to or less than the second scope.

In another general aspect, a computer-implemented method is described that includes receiving, from a web-based application, a request to authorize an entity to access data associated with a user. The entity is configured to transmit the data to the web-based application for display to the user. The method also includes determining, without querying the user, whether the entity has received past authorization to access the data and transmitting a proof that the entity is authorized to access the data if the entity previously received authorization.

The systems and techniques described here may provide one or more of the following advantages. First, a system can provide automatic authorization of certain future service or data access requests by an entity that match authorizations already provided by a user, which may reduce the number of user actions for authorization approval as well as a number of round-trips needed for an authorization protocol. In another aspect, the credentials stored on behalf of a user can be reused for reauthorization of a given service or data source, which may reduce a number of user-stored credentials. In yet another aspect, a user can access an entity—which accesses the user's private data—from multiple devices (e.g., a desktop computer, a mobile device, a laptop computer) using various types of access software (e.g., different browsers) without having to re-authorize requests for the private data. Instead, access to the private data can be automatically authorized independent of a device or software that previously provided the authorization.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

In some implementations, obtaining an authorization credential to perform a given service or access a data source on behalf of an entity requires the entity to approve the authorization. The approval may require interaction from the entity (e.g., a user) and one or more queries and responses using an authorization protocol. In the context of web applications, the authorization may require user interface changes (e.g., such as the presentation of an authorization screen), and, in some implementations, the user must approve each authorization. By automatically performing authorization of certain future requests that match authorizations already provided by the user, the number of user actions for authorization approval may be reduced. Additionally, the number of queries and responses using the authorization protocol may be reduced. Further, in some implementations, a number of credentials stored on behalf of a user may be reduced provided that the tokens are reused for each reauthorization of a given service or data source.

In some implementations, a request for authorization may include one or more services or data sources (also referred to as scopes) for which the authorization is requested. During the request, a service provider can check a history of prior authorizations. Assuming the current request matches a set of criteria applied to past authorization requests, the authorization credential can be automatically granted according to one implementation.

In some implementations, if the current request does not match the set of criteria applied to the past authorization requests, the user can be prompted to approve the authorization. The service provider can grant the authorization credential, provided that the user approves the authorization. In some implementations, the criteria for automatically granting a new authorization based on prior authorizations can include rules regarding the number of authorizations already granted, a number of authorizations granted to the same entity, a record of past authorizations of a given type of data or service, or a record of past authorizations that may be a superset of the current authorization request.

Figure 1:
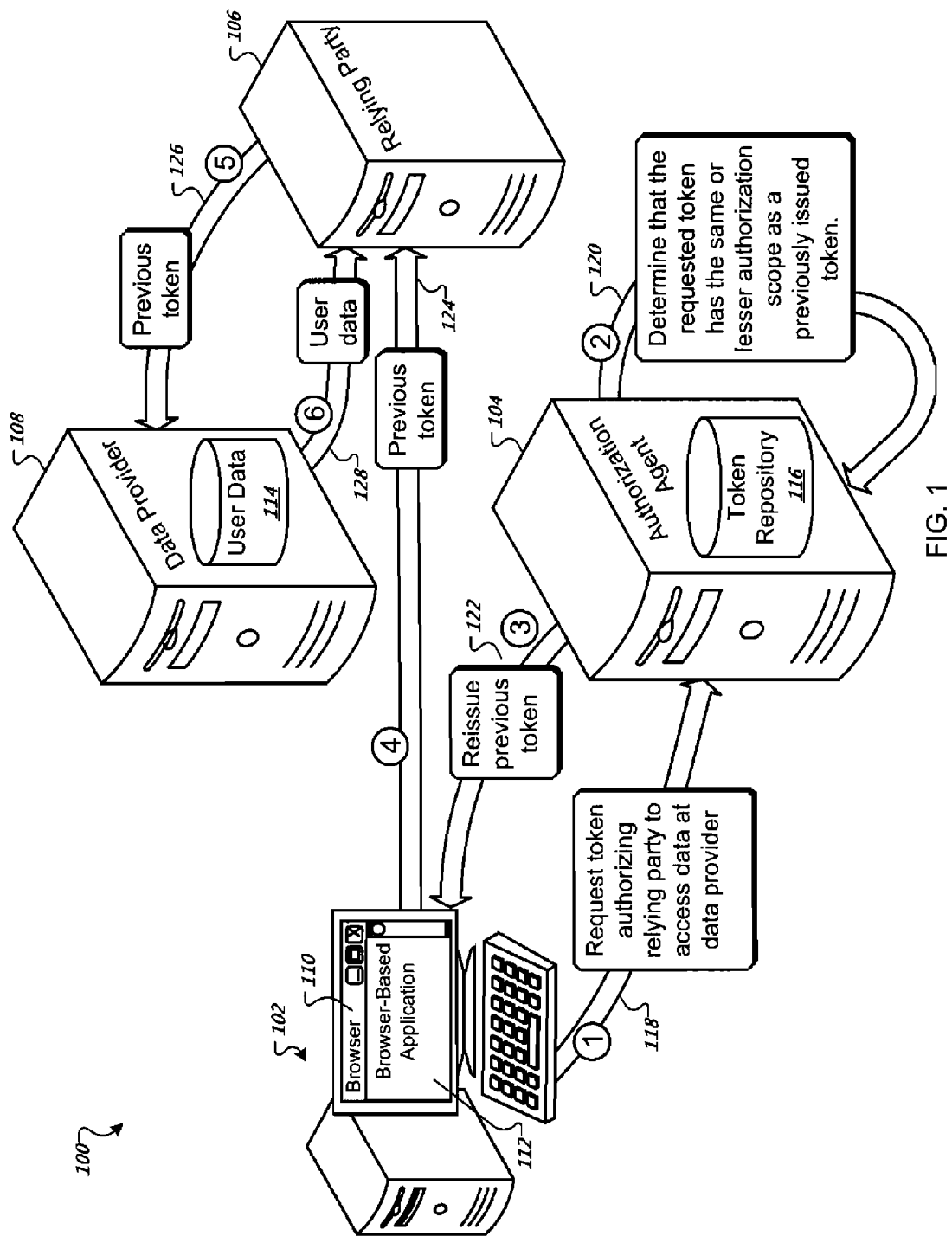
FIG. 1 is a schematic diagram of an exemplary system for authorizing a current request based on previous requests.

FIG. 1 is a schematic diagram of an exemplary system 100 for authorizing a current request based on previous requests. The exemplary system 100 includes a client 102, an authorization agent 104, a relying party 106, and a data provider 108.

A user can launch a web browser 110 stored on the client 102 and navigate to view a web page hosted on a third party's remote server, also referred to here as a relying party 106. The browser 110 can transmit a hypertext transport protocol (HTTP) request for the web page, which may include application code that runs inside the client's browser 110. In response to the request, the relying party 106 can transmit the requested web page having the application code to the client 102 that is running the browser 110. The browser 110 can display the web page that includes a browser-based application 112.

In some implementations, the browser-based application 112 can request services from the relying party 106 that require the relying party 106 to access a user's data, which may be stored at the data provider 108 (e.g., in a user database 114). For example, the browser-based application 112 can be a mashup or a GOOGLE gadget that is included in a web page hosted by the relying party 106. The mashup or gadget may request access to data that belongs to the user viewing the mashup or gadget (e.g., a calendar data, email data, etc.).

In some implementations, if the user has not previously visited the web page, the relying party 106 may require proof of authorization from the browser-based application 112 to initiate retrieval of (or access to) the user's data. For example, the relying party 106 can prompt the browser-based application 112 for an authorization token issued by the authorization agent 104. In some implementations, the browser-based application 112 can request the authorization token from the authorization agent 104. The authorization token can provide proof to the relying party 106 that the browser-based application 112 is permitted to access the user data via the relying party 106.

In some implementations, if the user has previously authorized the browser-based application 112 to access the user's data, the system 100 can obtain an authorization token based on previous requests instead of requiring reauthorization by the user. In some implementations, the browser-based application 112 can request a token authorizing the relying party 106 to access user data from the data provider 108, as indicated by an arrow 118 labeled "1".

The authorization agent 104 can determine that the requested token has the same or lesser authorization scope as a previously issued token, which is stored in a token repository 116, as indicated by an arrow 120 labeled "2". In some implementations, the authorization agent 104 reissues a previous token and transmits the token to the client 102, as indicated by an arrow 122 labeled "3". The client 102 transmits the previously issued token to the relying party 106, as indicated by an arrow 124 labeled "4". The relying party 106 transmits the previously issued token to the data provider 108, as indicated by an arrow 126 labeled "5".

The data provider 108 can use the token to verify that the relying party 106 is authorized to access the user data indicated by the token. After verification, the data provider 108 can transmit the requested user data to the relying party 106, as indicated by an arrow 128 labeled "6". The relying party 106 then can provide the user data to the browser-based application 112 (e.g., the mashup or GOOGLE gadget) for display or manipulation.

The arrows of FIG. 1 are labeled with numbers that indicate a possible sequence of operations, although this order is not intended to be limiting. For example, some of the operations can be performed in parallel.

For purposes of explanation, one example of the system 100 and the sequence of operations are described. For instance, the browser-based application 112 can be a calendar mashup application that retrieves a user's calendar data and displays it on a portion of a web page. After receiving a request from the browser-based application 112 for an authorization token, the authorization agent 104 can determine that the browser-based application 112 previously requested not only the user's calendar data but also the user's email data as well as the calendar data for use by the relying party 106. Therefore, in one implementation, the authorization agent 104 can issue an authorization token for the calendar data without requiring explicit permission from the user because the user has already approved an access of a larger scope, namely, access to the calendar and email data.

In another implementation, the authorization agent 104 can reissue the same token that was previously issued instead of generating a new token. This may decrease the amount of tokens associated with a single user, which may be important if the authorization agent limits the amount of tokens it issues for a single user (e.g., because of security restraints, storage space restraints, processing restraints, etc.).

In some implementations, the data provider may also be the authorization agent although these are shown as separate entities in FIG. 1. For example, data provider may authorize relying parties to access user data stored at the data provider. For example, the data provider can be one or more GOOGLE servers that store a user's calendar and email data. Additionally, the GOOGLE servers can issue authorization tokens to relying parties so that the relying parties can access the user data stored at the servers.

Figure 2:
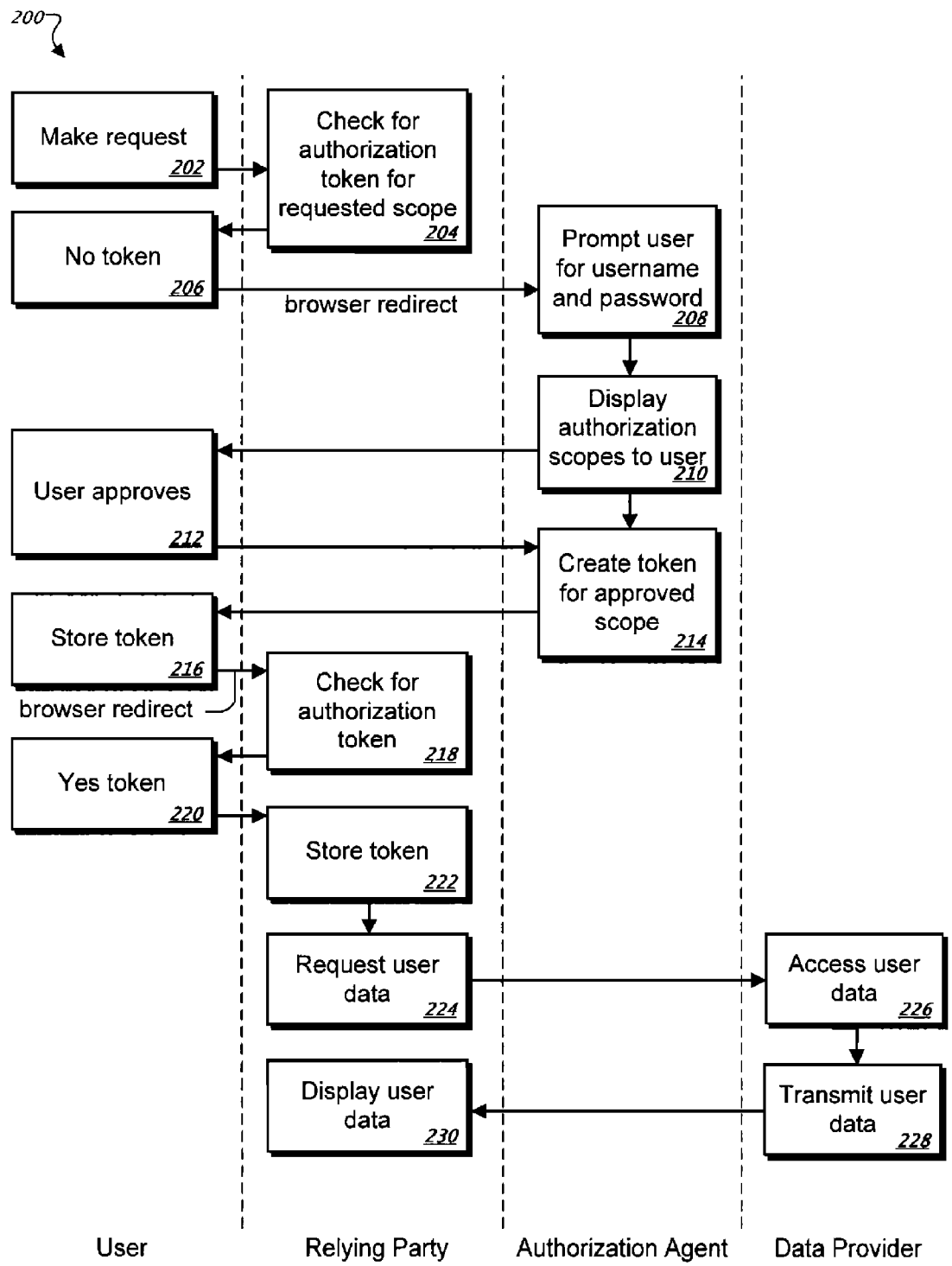
FIG. 2 is a sequence diagram of an exemplary sequence of a user granting an authorization for a relying party to access the user's data.

FIG. 2 is a sequence diagram of an exemplary sequence 200 of a user granting an authorization for a relying party to access the user's data. The sequence 200 shows interactions among a user, a relying party, an authorization agent, and a data provider. In some implementations, the sequence 200 occurs the first time a user accesses a web page at a relying party. The web page can include a browser-based application (e.g., a mashup or GOOGLE gadget) that requests access to user data (e.g., a calendar or email) via the relying party. A web browser executing on a client operated by the user can access the browser-based application. In order for the browser-based application to access user data, the relying party requests an authorization token which is granted if permitted by the user.

In some implementations, the sequence 200 begins when the browser-based application (e.g., a mashup) requests user data from the relying party in step 202. In step 204, the relying party that hosts the browser-based application code checks for an authorization token that is commensurate with the requested scope to determine if the relying party can access the user's data.

In the sequence of FIG. 1, it is determined that the user does not have an authorization token for the requested scope, in step 206. In some implementations the browser is redirected to a web site hosted by the authorization agent.

In step 208, the authorization agent can prompt the user for credentials, such as a username and password, to determine the identity of the user. In other implementations, the user may already be logged into the authorization agent or may have a cookie stored on the client that identifies the user.

In step 210, after the user is successfully identified by the authorization agent, the authorization agent can display to the user authorization scopes that indicate services or data that the relying party would like to access. If the user approves the scopes, in step 212, the authorization agent creates an authorization token that corresponds to the approved scope, in step 214.

In step 216, the authorization agent transmits the token to the user for storage (e.g., as a cookie in a "cookie jar" of the browser) at the client that is executing the browser-based application. Next, in some implementations, the browser can be redirected back to the original web site hosted by the relying party.

The browser-based application can now provide the relying party with an authorization token. In step 218, the relying party again checks for authorization for the requested scope to determine if it can access the requested user's data. This time the user has an authorization token for the requested scope, as indicated in step 220.

In step 222, the client transmits the authorization token to the relying party, which receives and stores the token. The relying party requests the user data from the data provider, in step 224. As part of the request, the relying party transmits the authorization token to the data provider, which can use the authorization token to verify that the relying party is permitted to access the user data stored at the data provider, in step 226.

Assuming the data provider validates the authorization token, the data provider transmits the requested user data back to the relying party, in step 228. The relying party can then display or manipulate the user data using the browser-based application in step 230.

In some implementations not shown in FIG. 2, at step 212, a user may not authorize the use of its data by the relying party. If a user does not authorize the requested scope of access, the authorization agent can redirect the user's browser to a site other than the relying party's web site (e.g., the authorization agent can direct the user to a home page of the authorization agent or other trusted web site). The user may refuse to authorize the use of its data by the relying party, for example, if the authorization indicates that an entity requesting access to the data does not correspond to the entity associated with the web page that the user accessed.

In some implementations, the authorization agent may refuse to grant an authorization token even if a user approves the scope requested by the relying party. For example, this may occur if a token threshold count has been met. The token threshold may be related to how many tokens a client is permitted or able to store (e.g., a browser may only be able to store 4 k of information used for authorization purposes). The token threshold may be related to how many tokens the authorization agent can manage or store. For example, a storage provider may not have sufficient storage to store eight tokens for 1.25 million users, where the tokens are 10 kilobytes in size, because this would require over 100 gigabytes of storage space.

If the token threshold count is met, the user may be alerted and given a chance to revoke a previously granted token. In another implementation, the authorization agent can automatically revoke or erase the oldest token and grant the newly requested token.

Figure 3:
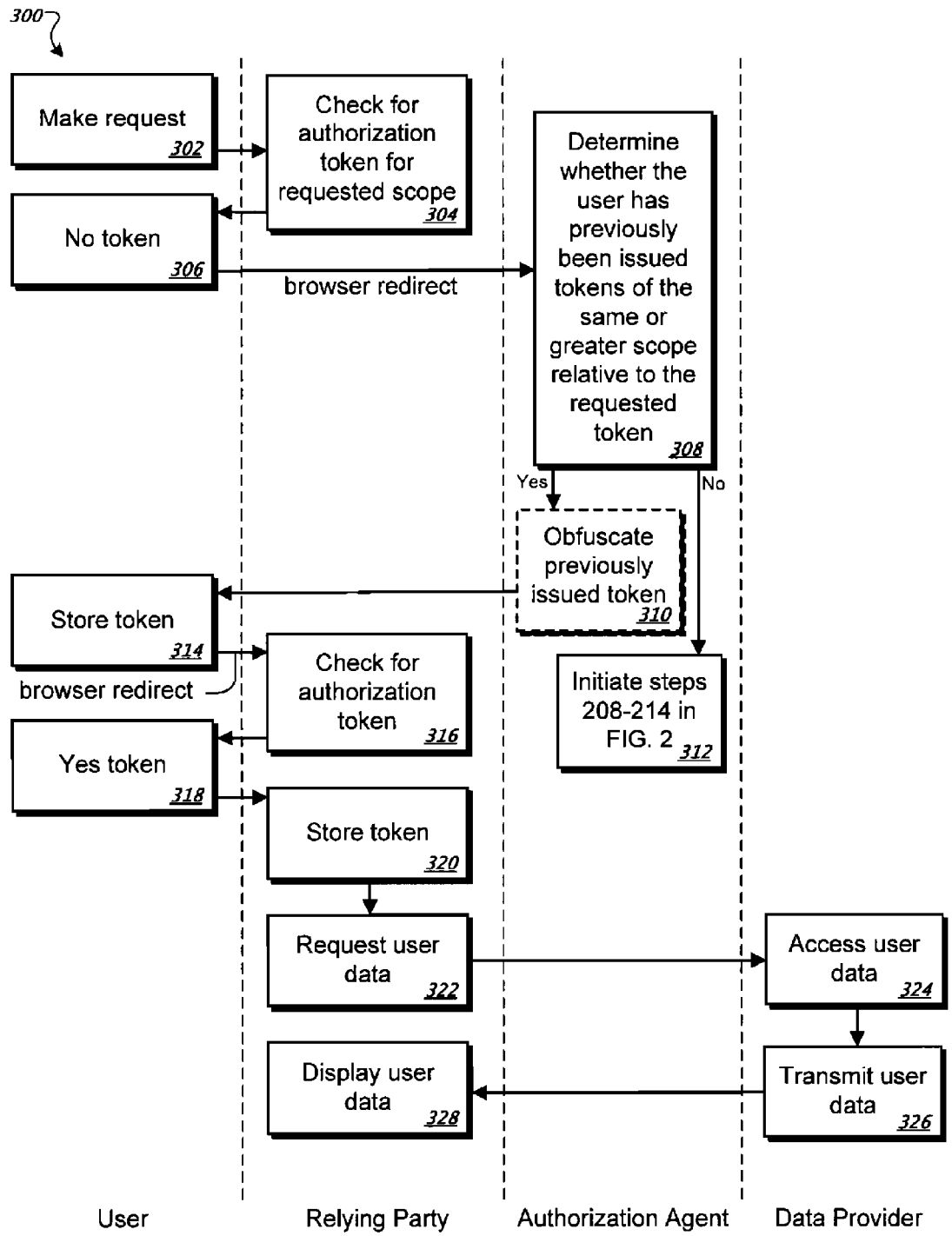
FIG. 3 is a sequence diagram of an exemplary sequence of an automatic authorization for a relying party to access a user's data.

FIG. 3 is a sequence diagram of an exemplary sequence 300 of an automatic authorization for a relying party to access a user's data. The sequence 300 shows interactions among a user, a relying party, an authorization agent, and a data provider. The sequence 300 can occur when a user has previously accessed a web page at a relying party. The web page can be a browser-based application (e.g., a mashup or GOOGLE gadget) that requests access to a user's data (e.g., a calendar or email) via the relying party.

Similar to the first steps of the sequence 200 of FIG. 2, a web browser operated by a user can access the browser-based application hosted at the relying party. In order for the browser-based application to access user data, the relying party requests an authorization token from an authorization agent.

However, in contrast to the sequence 200 of FIG. 2, the user has previously accessed the web page hosted at the relying party. For example, the user may have accessed the web page and previously granted access to both the user's photos and contact information. If the new request only requests authorization for the user's photos, the authorization agent can determine that a previous authorization token associated with a larger scope (e.g., the photos and contact information) has been granted and can automatically grant a token associated with the smaller scope (e.g., the user's photos).

More specifically, the sequence 300 begins when the browser-based application (e.g., a mashup) requests user data from the relying party in step 302. The relying party that hosts the browser-based application code checks for an authorization token for the requested scope to see if it can access the user's data, in step 304. It is determined that the user does not have an authorization token for the requested scope, in step 306.

In some situations, the token may not be found on the user's client because it has been cleared, or erased, as part of a normal memory maintenance routine. In other situations, a token associated with the relying party is found, but the token is associated with a different scope than the currently requested scope. In yet other situations, the user may have visited the web site of the relying party using a different client so that the token is stored on the client used previously, but not the client currently used by the user.

In step 308, the authorization agent determines whether the user was previously issued authorization tokens associated with the same or greater scope relative to the requested token for the relying party. For example, the authorization agent receives a request from a user for an authorization token, which will allow a relying party the ability to access user data. The authorization agent can search its token repository for tokens previously issued to the user. The authorizing agent compares the scope of the requested data to scopes of authorization tokens previously issued to the same relying party. If the scope of the newly requested token is the same as or a subset of the scope of a previously requested token, the authorization agent can automatically issue the newly requested token without explicit approval from the user.

In some implementations, the newly issued token may be a reissue of the previously granted token that included the greater scope. In other implementations, the newly issued token is not derived from the previously granted token (e.g., it is associated with an identifier that is different from the previously granted token).

As shown in FIG. 3, if the newly issued token is a reissue of a previously granted token, the reissued token can be obfuscated in optional step 310, prior to transmitting the token to the user, which in turn transmits the reissued token to the relying party. The obfuscation may prevent the relying party from identifying a series of user actions or web site accesses by comparing a previously issued token to the reissued token and determining that they are from the same user.

Obfuscation of the authorization token prior to sending it to the relying party may prevent this correlation from occurring. The obfuscation can modify the reissued token so that it is different from its previously issued form (e.g., identifiers associated with the original and reissued tokens may be different).

In step 312, if the authorizing agent determines that a previous token having the same or larger scope has not been granted, then the sequence 300 can execute steps that are substantially similar to the steps 208-214 of FIG. 2, which describe obtaining permission from a user to generate an authorization token.

Returning to the example where the token is automatically granted without user intervention, the authorization token (which may be optionally obfuscated) is transmitted to the user for storage, in step 314. The browser-based application can now provide the relying party with an authorization token. The relying party checks for authorization for the requested scope to see if it can access the user's requested data, in step 316. The user has an authorization token for the requested scope, in step 318. The client sends the authorization token to the relying party, which receives the token and stores it at the relying party, in step 320. The relying party requests from the data provider the user data requested by the browser-based application, in step 322. The relying party transmits the authorization token to the data provider, which uses the authorization token to obtain access to the user data from the data provider, in step 324. The data provider transmits the requested user data back to the relying party, in step 326. The relying party displays the user data in the browser-based application to the user (e.g., a calendar, email) in step 328.

As discussed previously, in some implementations, there may be a maximum number of authorization tokens that an authorization agent can issue and store on a client. The amount of memory needed for the storage of each token, and the amount of memory available on the client for storing the total number of tokens can determine the maximum number of tokens allowed. For example, a web browser may allocate 4 kilobytes of memory for cookie storage. This may permit the maximum storage of twenty cookies on a client. Users can configure their browsers to periodically delete cookies (e.g., on browser exit) which can free up memory for additional token storage. Referring to FIG. 1, the authorization agent 104 can store authorization tokens in a token database included in the token repository 116. However, even if it is determined that an authorization token can be given to the relying party, if the client running the browser-based application cannot store the token as a cookie for the web browser on the client, the relying party will not be able to receive the authorization token.

Figure 4:
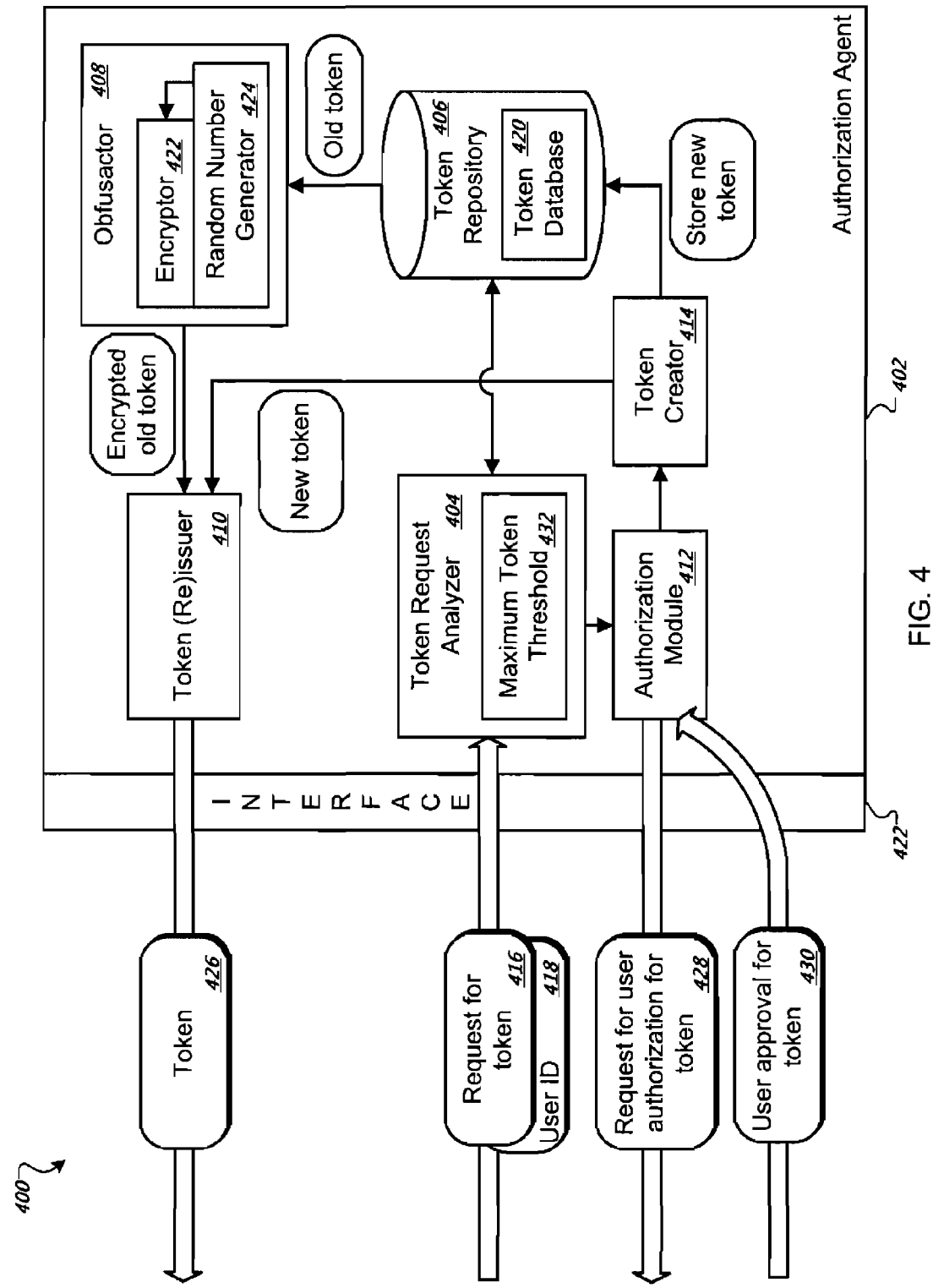
FIG. 4 is a block diagram of an exemplary system for authorizing requests to access a user's data.

FIG. 4 is a block diagram of an exemplary system 400 for authorizing requests to access a user's data. The exemplary system 400 includes an authorization agent 402 that in turn includes a token request analyzer 404, a token repository 406, an obfuscator 408, a token (re)issuer 410, an authorization module 412, and a token creator 414.

As shown in FIG. 4, the token request analyzer 404 can receive a request for token 416. The request for token 416 can also be associated with a transmitted user ID 418. The token repository 406 can store authorization tokens created by the authorization agent 402 in a token table within a token database 420.

The tokens can be stored for each user based on, for example, a user ID 418. For example, the authorization agent can use user IDs to index generated authorization tokens so that each token is associated with a particular user.

The token request analyzer 404 can determine whether a token stored in the token repository 406 (an old token) satisfies requirements of the request of the token 416. This is subsequently described in more detail in association with FIG. 5.

The obfuscator 408 can encrypt previously issued tokens before the authorization agent 402 reissues the tokens so that a relying party cannot correlate previously issued and reissued tokens, and thus prevent correlation of activities associated with the tokens (which may compromise the privacy of the user associated with the tokens). The token (re)issuer can transmit a new token or reissue a previously granted token to the client in response to the request for a token 416 from the client.

The authorization agent 402 also includes an interface 422 that can control communications between the authorization agent 402 and a client (e.g., client 102, as shown in FIG. 1) executing a browser (e.g. browser 110) running a browser-based application (e.g., browser-based application 112).

If the token request analyzer 404 determines the reissuing of an old token cannot occur, the authorization module 412 may transmit a request for user authorization for token 428. The request for user authorization 428 may include redirecting a user to a web page that asks the user to approve the creation of a new token using token creator 414. The token repository 406 can store the new token in the token database 420. The token (re)issuer 410 can issue the new token to the client.

In one example of the operation of the system 400, the authorization agent receives the request for token 416 and the user ID 418. In some implementations, in order to create or reissue authorization tokens, the user needs to identify itself to the authorization agent 402. The user ID 418 can identify the user requesting the token to the authorization agent 402. In some implementations, a user may log into a data provider and receive a user ID 418 prior to requesting an authorization token.

The token request analyzer 404 can receive the request for token 416 and the user ID 418. The request for token 416 can include the name of the relying party requesting the token as well as the scope of the data or services requested. The token request analyzer 404 can check token table entries in the token database 420 for tokens associated with the received user ID. The token request analyzer 404 can determine if a token associated with the user has a scope that matches or is a superset of the scope of the data requested for the relying party.

In one implementation, if such a token exists in the token database 420, the token repository 406 can send the old token to the obfuscator 408. The obfuscator 408 can use an encryptor 422 and a random number generator 424 to encrypt (e.g., hash) the old token based on a random number generated by the random number generator 424. The obfuscator 408 can send the encrypted old token to the token (re)issuer 410. The token (re)issuer 410 can transmit the token 426 to a client. The client can send the authorization token to a relying party, which can access user data for use in a browser-based application.

In another implementation, the token creator 414 can generate a new token if a previously granted token is identified that has a matching or superset of the requested scope. The token creator 414 transmits the new token to the token repository 406 for storage and to the token (re)issuer 410 for transmission to the requesting client.

If the token request analyzer 404 determines a token having a matching or superset scope is not available in the token repository 406, the token request analyzer 404 can communicate this determination to the authorization module 412. The authorization module 412 can transmit a request for the user to authorize the creation of a new token 428. If the authorization module 412 receives user approval for the creation of the new token 430, the token creator 414 can create a new token. The new token can specify that the user has approved a particular scope of access for the relying party. The new token can be stored in the token repository 406 in a token table in the token database 420 for the identified user.

In some implementations, the token request analyzer 404 can use a maximum token threshold 432 to determine whether to issue a new token to a user. In some implementations, the maximum token threshold 432 can be a maximum number of tokens that an authorization agent 402 can issue to a user as discussed previously. Therefore, before creating a new token in response to the request for token 416, the token request analyzer 404 can check if the token count would meet or exceed the maximum token threshold 432. If so, the authorization agent 402 may not issue the new token to the user.

For example, the authorization agent 402 may issue a maximum of twenty tokens to a user. If creating a new token would result in a twenty-first token, the token request analyzer 404 can determine that the new token should not be issued because the token count would then exceed the maximum token threshold 432.

In some implementations, if the request for a token is similar to a previously issued token and the number of issued tokens to the user is equal to the maximum token threshold count, the authorization agent 402 may reissue a token that has a similar scope to the requested token 416. For example, a previous token may grant read and write access to a user's contact data. This token may be reissued if the request for a token 416 requests that the same relying party have only read access to the user's contact data.

In some implementations, the user ID 418 can identify a user to the authorization agent 402 across a variety of devices and/or software programs used to access the authorization agent 402. This may enable the authorizing agent to determine if it has previously issued the requested token to the user even if the user requested the token from a different machine. In some implementations, if the authorization agent has previously issued the requested token to a first machine used by the user, the authorization agent can automatically issue a new token (or reissue the old token) of the same scope to a second machine used by the user.

For example, a user can receive a cookie that is stored on the user's desktop computer and identifies the user to the authorizing agent. The user may receive the cookie after logging into a web site hosted by the authorizing agent. The user also may receive authorization tokens when using the desktop computer.

The user may subsequently use a different device such as a mobile phone. The mobile phone can include a cookie that identifies the user as the same user of the desktop computer. The mobile phone may receive the cookie after the user logs into authorization agent. The mobile phone may request tokens that have previously been granted and transmitted to the user's desktop computer. The authorization agent can identify that the user of the mobile device and the desktop computer are the same and automatically transmit new (or reissued) tokens that correspond to the previously granted tokens for that user.

Figure 5:
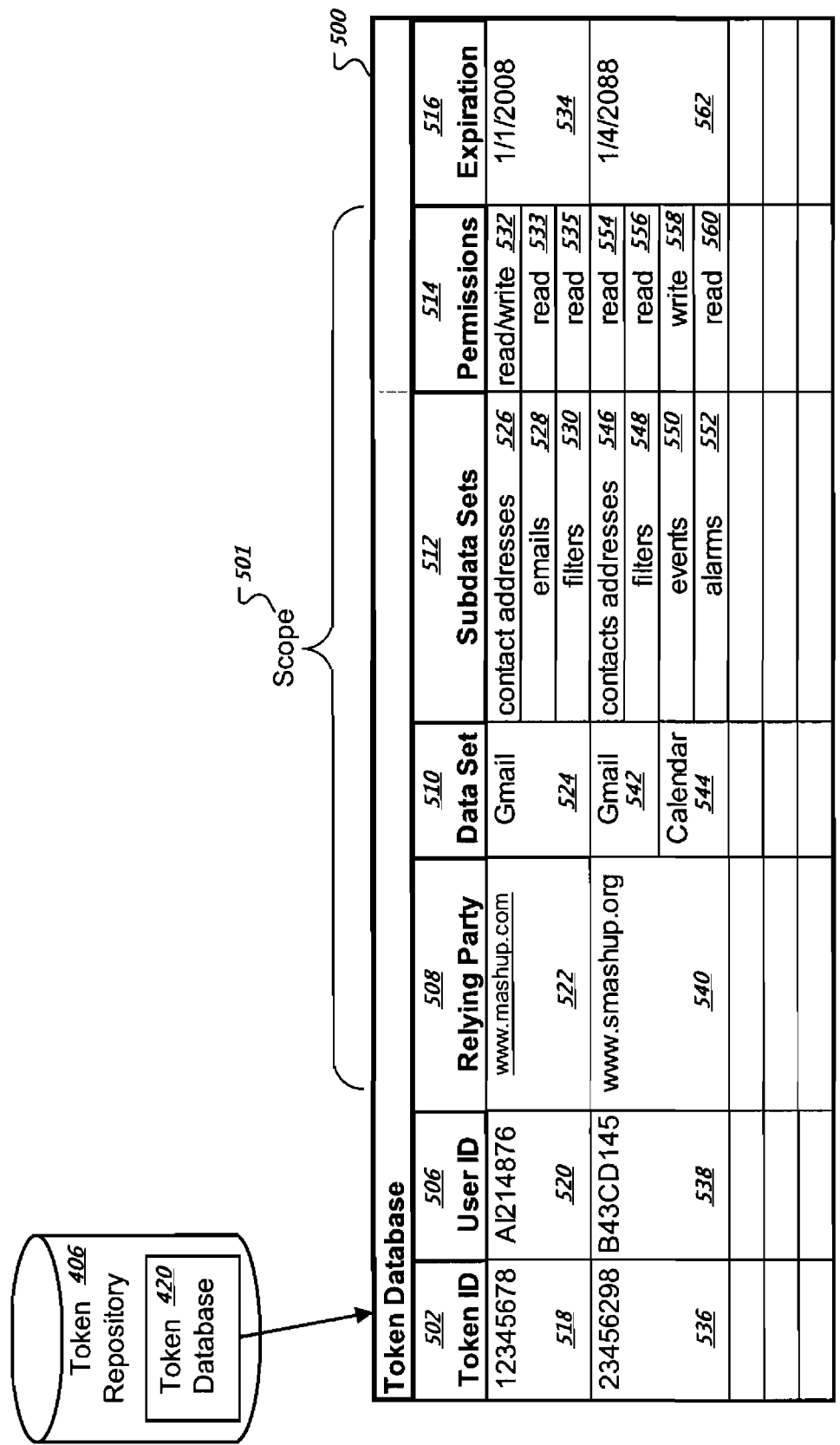
FIG. 5 is a table of exemplary data used to determine whether to authorize a current request based on previous requests.

FIG. 5 is a table 500 of exemplary data used to determine whether to authorize a current request based on previous requests. The table 500 can be included in the token database 420 of the token repository 406 shown in FIG. 4.

As shown in FIG. 5, the table 500 can include information related to each token issued by an authorization agent (e.g., authorization agent 402). The decision to issue a token automatically based on previously issued tokens can be determined using the information in table 500. The table 500 includes a scope information 501 that includes a relying party 508 authorized to a data set 510. The data set 510 can be further specified using subdata sets 512 that identify particular data within a data set that may be accessed. The scope information 501 can also include permissions, such as read/write/delete/create/etc. rights that are associated with a relying party's access to the listed data.

A token ID table entry 502 can uniquely identify each token issued by the authorization agent 402. A user ID table entry 506 identifies the token for use by a specific user. The authorization agent 402 can use a user ID in combination with a token ID to keep track of the number of tokens issued to a particular user. This information can be compared the maximum token threshold 432 to determine whether to issue additional tokens to users.

In the example of FIG. 5, the relying parties 508 are identified using a Uniform Resource Locator (URL) of a web page having a browser-based application that requests an authorization token. An expiration column of the table 500 can specify an expiration date after which the token is no longer valid.

As shown in FIG. 5, the assigning of a token with a token ID 12345678 (518) to a user with a user ID AI214876 (520) can occur when a user approves a requested scope for relying party www.mashup.com 522. The approved scope can include a GOOGLE GMAIL 524 data set and the subdata sets included in the GOOGLE GMAIL data set that the relying party can access. In this example, the relying party www-.mashup.com 522 can access GOOGLE GMAIL 524 including subdata sets contact addresses 526, emails 528, and filters 530.

In some implementations, such as the one shown in FIG. 5, the approved scope can also include permissions 514 associated with each of the subdata sets 512, which indicate what actions a relying party is permitted to perform on the subdata sets 512. In the example of FIG. 5, the relying party www-.mashup.com 522 has read/write permissions 532 for the contacts addresses 526, read permissions 533 for the emails 528, and read permissions 535 for the email filters 530, in the GOOGLE GMAIL 524 data set.

The token ID 12345678 (518) has been assigned an expiration date of Jan. 1, 2008 (534) by the authorization agent. In some implementations, the expiration date can be determined by the amount of time the data provider will allow the relying party approved access to the user data. For example, a data provider may limit the amount of time a token can remain valid to improve security.

In some implementations, the authorization agent can set the expiration date to ensure that the token repository 406 maintains an adequate amount of storage space. For example, the authorization agent can delete all tokens over a certain age to free up storage space for new tokens.

In another example shown in FIG. 5, the assigning of token ID23456298 (536) to user ID B43CD145 (538) can occur when a user approves the scope for relying party www.smashup.org 540. The approved scope can include data sets GOOGLE GMAIL 542 and GOOGLE Calendar 544 with the subdata sets specifying particular data within each of the data sets 542 and 544 that the relying party can access. In this example, the relying party www.smashup.org 540 can access GOOGLE GMAIL 542 subdata sets contacts addresses 546 and filters 548, and GOOGLE Calendar 544 subdata sets events 550 and alarms 552. The relying party www.smashup.org 540 has read permissions 554 for the contacts addresses 546, and read permissions 556 for the filters 548 in the GOOGLE GMAIL 542 data set. The relying party www.smashup.org 540 has write permission 558, and read permission 560 for the subdata sets events 550, and alarms 552, respectively, in the GOOGLE Calendar 544 data set. The token ID 2345298 (536) has been given an expiration date of Jan. 4, 2088 (562).

In some implementations, a single token authorizes multiple scopes (e.g., access to different data sets or services). In the example table 500, the token ID 23456298 (536) is a multiscope token that authorizes access by the relying party www.smashup.org (540) to both GOOGLE GMAIL 542 and GOOGLE Calendar 544 data sets.

In the example shown in FIG. 5, the assigning of a token with a token ID12345678 (518) to a user with a user ID AI214876 (520) can occur when a user approves the scope for relying party www.mashup.com 522. The approved scope can include data set GOOGLE GMAIL 524 with the subdata sets specifying particular data within the data set of GOOGLE GMAIL that the relying party can access.

The relying party www.mashup.com 522 can access subdata sets contacts addresses 526, emails 528, and filters 530. For token ID 23456298 (536), the approved scope that relying party www.smashup.org 540 can access includes subdata sets contacts addresses 546, and filters 548, included in the GOOGLE GMAIL 542 data set. In some implementations, the approved scope of one token for one relying party can include different subdata sets for the same data set as another token for another relying party.

In some implementations, an authorization agent can compare a request for a token from a user to a list of existing tokens in the token table. In some implementations, the authorization agent can reissue the existing old token, as was described with reference to FIG. 4, if the scope of the requested token either exactly matches the scope of an existing token or is a subset of an existing token for a relying party.

For example, referring to table 500, an authorization agent receives a request for a token for relying party www.mashup.com from a user whose user ID is AI214876. The relying party wants to access the contact addresses subdata set of the GOOGLE GMAIL data set for reading and writing. The authorization agent determines it can reissue token ID 12345678 without explicit approval from the user, as the scope of the request is a subset of the scope of the previously issued token. Alternatively, the authorization agent can automatically generate a new token for the requested scope instead of reissuing the old token.

In another example, referring to table 500, an authorization agent receives a request for a token for relying party www.smashup.org from a user whose user ID is B43CD145. The relying party wants to access the contact addresses subdata set for reading and writing in the GOOGLE GMAIL data set. The authorization agent determines it cannot reissue token ID 23456298, as the scope of the request is not included in the scope of the existing token (the existing token allows the relying party only read access to the contacts addresses). The authorization agent then may transmit a request that the user approve the requested scope as previously described.

In another example, referring to table 500, an authorization agent receives a request for a token for relying party www.smashup.org from a user whose user ID is B43CD145. The relying party wants to access the contacts addresses subdata set with delete permission in the GOOGLE GMAIL data set. The authorization agent determines it cannot reissue token ID 23456298, as the scope of the request is not included in the scope of the existing token (the existing token allows the relying party only read access to the contacts addresses).

In another example, referring to table 500, an authorization agent receives a request for a token for relying party www.smashup.org from a user whose user ID is B43CD145. The relying party wants to access the emails subdata set for reading in the GOOGLE GMAIL data set. The authorization agent determines it cannot reissue token ID 23456298, as the scope of the request is not included in the scope of the existing token (the existing token does not allow access to the email subdata set of the GOOGLE GMAIL data set).

A multiscope token, such as token ID 23456298 (536) in table 500, can allow the relying party, www.smashup.org, authorization to access both the GOOGLE GMAIL data set and the GOOGLE calendar data set. For example, an authorization agent receives a request for a token for relying party www.smashup.org, from a user whose user ID is B43CD145, where the relying party wants to access either the GOOGLE GMAIL data set or the GOOGLE Calendar data set. If the subdata set and associated permissions for the request match or are a subset of the subdata set and associated permissions for token ID 23456298 (536), the authorization agent can reissue the token.

In another implementation, the scope does not describe specific subdata sets or the value of the subdata sets is "all" indicating that the relying party has access to all subdata within a data set. If the relying party www.smashup.org requests a token having a scope that includes access to Gmail, the authorization agent can automatically issue/reissue a token having this scope because the previously granted token 23456298 includes this scope. Likewise, if www.smashup.org requests a token having a scope that includes access to calendar data, the authorization agent can also automatically issue/reissue a token having this scope as well because the token 23456298 also include authorization to access the calendar data.

Figure 6:
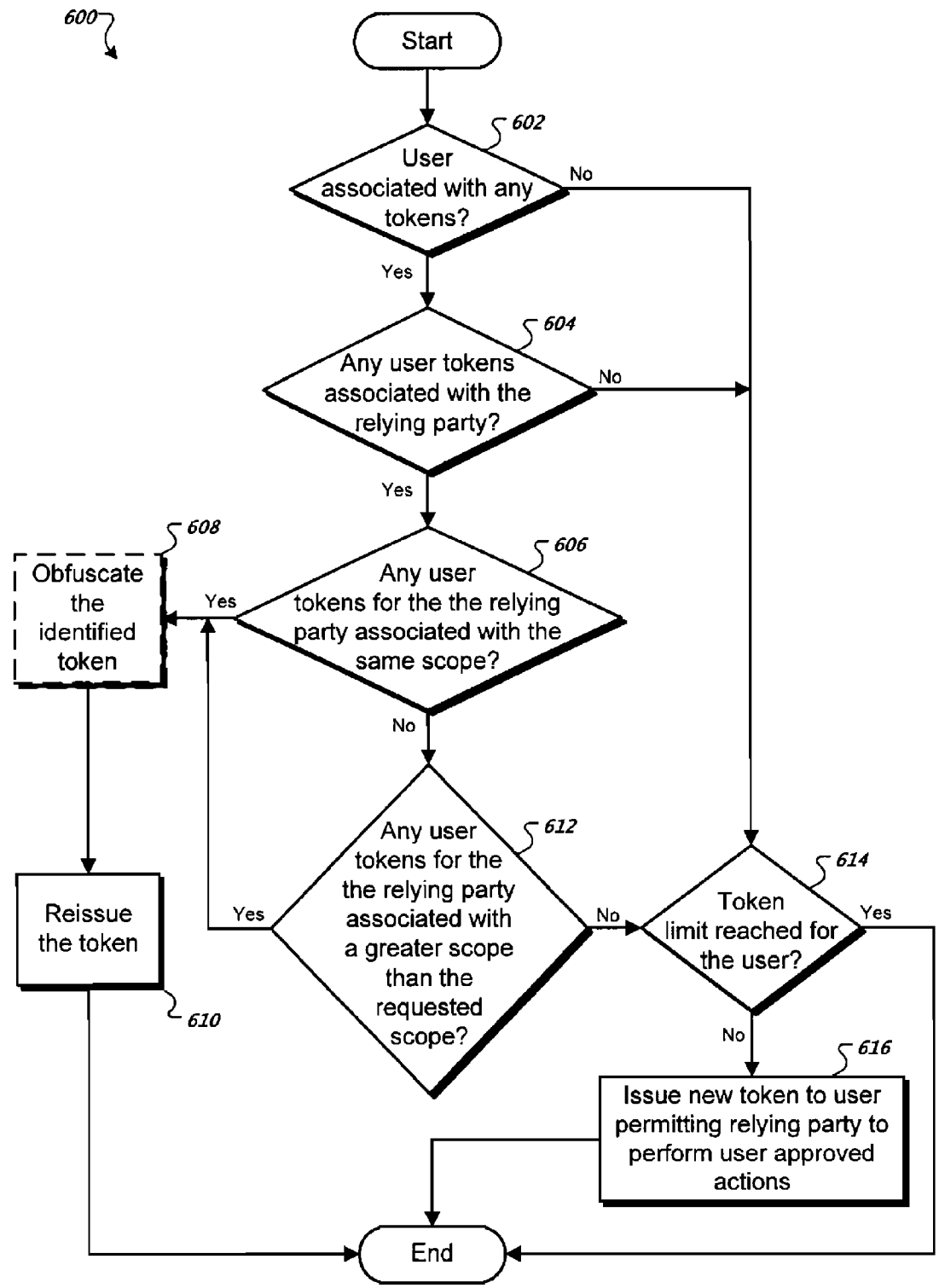
FIG. 6 is a flow chart of an exemplary method for authorizing a current request based on previous requests.

FIG. 6 is a flow chart of an exemplary method 600 for authorizing a current request based on previous requests. In certain implementations, the systems 100, 400 or other systems not shown can perform one or more of the steps of the method 600. For the purposes of illustration, the system 400 is used to describe the operations of the method 600, although this example is not intended to limit what system may perform the method 600.

The method 600 can begin in step 602, where it is determined if a user is associated with any tokens. For example, the authorization agent 402, using a received user ID, can parse a token table 500 to determine if the user is assigned any tokens. If the user does not have any assigned tokens, the method can proceed to step 614, which is described in more detail below. If it is determined that the user has at least one assigned token, the method continues to step 604.

In step 604, the authorization agent checks if any of the tokens assigned to the user are associated with the relying party requesting the current token. If the authorization agent determines that the user has a token assigned to the same relying party that is requesting the current token, the method continues to step 606, else the method 600 can perform step 614, which is described below.

In step 606, the authorization agent can determine if any user tokens for the relying party are associated with the same scope as the requested token. If a match exists, the authorization agent can optionally obfuscate the token, in step 608, and the method 600 continues to step 610 where the authorization agents reissues the token. After this, the method 600 can end.

If, in step 606, the authorization agent determines a match does not exist between the scope of the existing token and the requested token, the method continues to step 612. The authorization agent can determine, in step 612, if any user tokens for the relying party are associated with a greater scope than the requested scope. If such a token exists, the method continues to steps 608, 610 where the authorization agent can optionally obfuscate and reissue the identified token before ending.

If, in step 612, a token having a greater scope than the requested scope does not exist, the method 600 continues to step 614. In step 614, the authorization agent can determine if the user has reached a token limit. If the user has reached the token limit, the authorization agent may not issue a new token, and the method 600 can end. If the user has not reached the token limit, the authorization agent can create a new token assuming a user approves the scope requested by the relying party. In step 616, the new token is issued to the user permitting the relying party to perform user approved actions. After this, the method 600 can end.

Referring back to step 602, if the authorization agent determines that the user is not associated with any tokens, the method continues to previously described step 614. Similarly, if the authorization agent determines in step 604 that no user tokens are associated with the relying party associated with the current token request, the method also continues to step 614.

For example, referring to FIG. 4 and FIG. 5, the authorization agent 402 can receive a request for token 416 associated with user ID 418, (e.g., user ID AI214876) for a relying party (e.g., www.mashup.com 522) to read and write contact addresses and read emails in a GOOGLE GMAIL data set. In step 602, the token request analyzer 404 of the authorization agent 402 parses the token table 500 and determines that token ID 12345678 is associated with user ID AI214876. The method continues to step 604, where the token request analyzer 404 can determine that the identified token 12345678 is associated with the relying party www.mashup.com 522.

The method 600 continues to step 606 where the token request analyzer 404 can determine that the scope of the requested token is a subset of the existing token. The requested token would authorize read and write access to the contact addresses and read access to emails in a GOOGLE GMAIL data set. The existing token approves reading and writing 532 of contacts addresses 526, reading 533 emails 528, and reading 535 filters 530 in a GOOGLE GMAIL 524 data set. The authorization agent 402 can optionally obfuscate the old token, in step 608, using the obfuscator 408. The authorization agent 402 can reissue the token, in step 610, using the token (re)issuer 410. After this, the method 600 ends.

Figure 7:
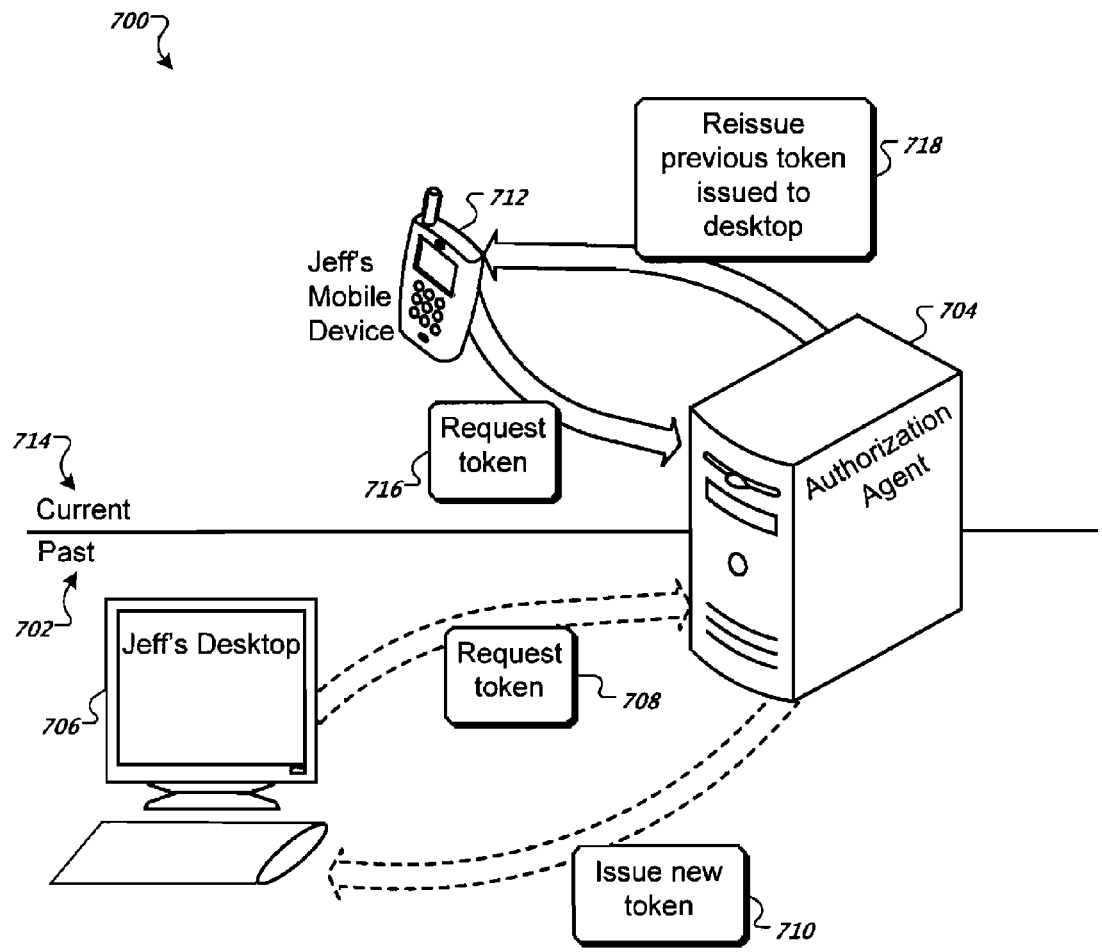
FIG. 7 is a schematic diagram illustrating how a current request from a first device can be authorized based on previous requests from a second device.

FIG. 7 is a schematic diagram 700 illustrating how a current request from a first device can be authorized based on previous requests from a second device. The diagram 700 illustrates a past interaction 702 that resulted in the issuing of a new token by an authorization agent 704 and a current interaction 714 that results in the reissuing of the previously issued token by the authorization agent 704.

As shown in FIG. 7, in a past interaction 702, a user Jeff can access the authorization agent 704 requesting an authorization token for a browser-based application (e.g., a mashup or GOOGLE Gadget) running on Jeff's desktop computer 706. In order to fulfill the token request, Jeff can identify himself to the authorization agent 704 by sending the authorization agent his user ID, as described in FIG. 4. In some implementations, Jeff can log onto a data provider (e.g., that hosts calendar, email, and other online data for Jeff) to receive his user ID. Jeff's user ID can be associated with any authorization tokens that the authorization agent creates for him. These tokens can be stored in a token database in a token repository included in the authorization agent 704.

While working on his desktop computer 706, for example, Jeff can accesses a web page associated with a relying party that requests approval to use Jeff's user data in a mashup browser-based application. Jeff's desktop computer 706 transmits a token request 708 to the authorization agent 704, which creates and stores the token in the token database on the authorization agent 704 if Jeff approves the requested access. The authorization agent 704 transmits the new token 710 to Jeff's desktop computer 706. Jeff's desktop computer 706 can receive the token and can store the token as a cookie (e.g., a cookie in the cookie jar of the browser).

As shown in FIG. 7, in a current interaction 714, the user Jeff can access an authorization agent 704 from a mobile device 712 and request a token for the same browser-based application involved in the past interaction 701. Jeff can identify himself to the authorization agent 704 by sending the authorization agent his user ID, as described in FIG. 4. In some implementations, Jeff can log onto his data provider from his mobile device 712 to receive his user ID.

While using his mobile device 712, for example, after work while riding a train home, Jeff can access the same web page he accessed earlier in the day from his office using his desktop computer 706. Jeff's mobile device 712 transmits a token request 716 to the authorization agent 704, which parses the token table to determine that a token associated with the same or greater scope exists. The authorization agent 704 then can automatically issue a token to the mobile device 712 in response to the token request without prompting Jeff for approval a second time. Jeff's mobile device 712 can receive and store the token as a cookie.

In some implementations, a user can configure options for use by an authorization agent that can control the creation and issuing of authorization tokens. For example, a user can specify that the authorization agent should not permit automatic generation of tokens based on previously granted tokens. Instead, the user can require that the authorization agent receive explicit approval before generating any new tokens.

Figure 8:
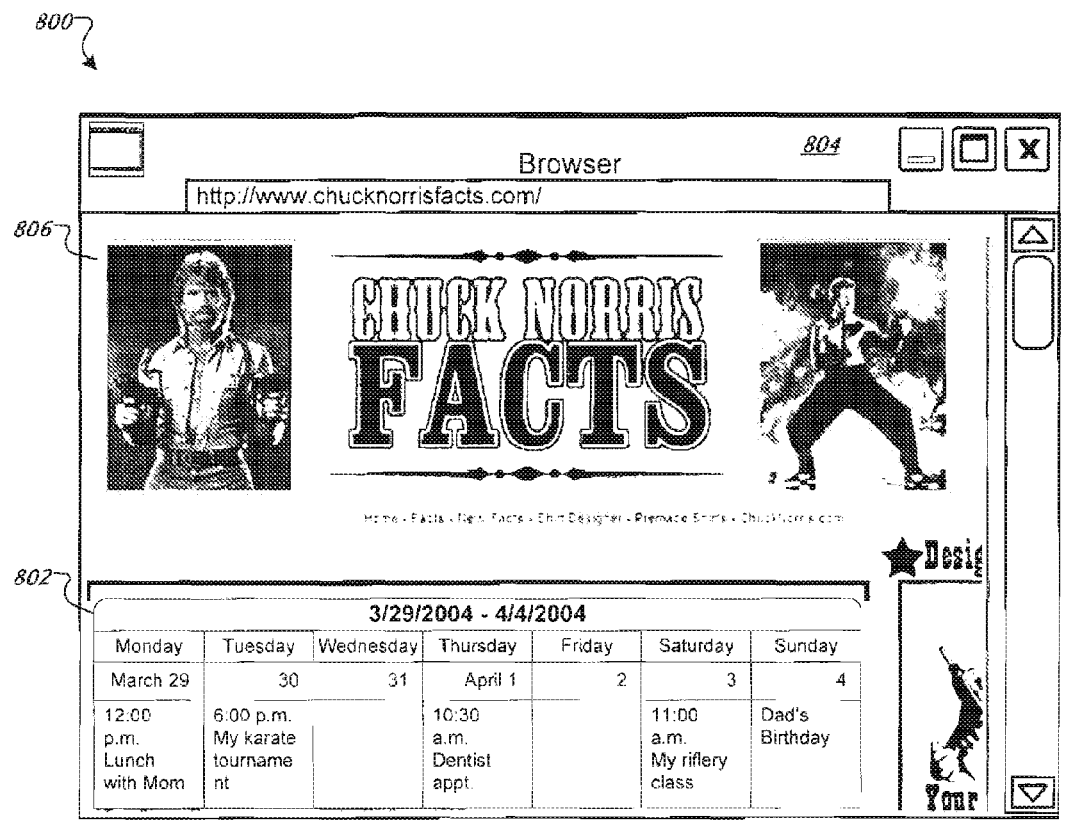
FIG. 8 is an exemplary screenshot of a browser-based application that incorporates a user's private data.

FIG. 8 is an exemplary screenshot 800 of a browser-based application 802 that incorporates a user's private data. In some implementations, when a browser 804 running on a client loads the web site 806, the browser executes application code, such as JavaScript code, which generates the browser-based application 802. In this example, the browser-based application is a calendar mashup application that retrieves a user's calendar data and displays it on a portion of the web page.

The screenshot 800 is an example of a web page that includes a mashup application after the mashup application has been authorized to retrieve the user's data, as previously described. By facilitating an authorization scheme, a user can execute applications hosted by relying parties and have the applications request services from data providers that, for example, have pre-existing relationships with the user (e.g., store private user data, host user email accounts, host user printing and fax services, etc.).

Figure 9:
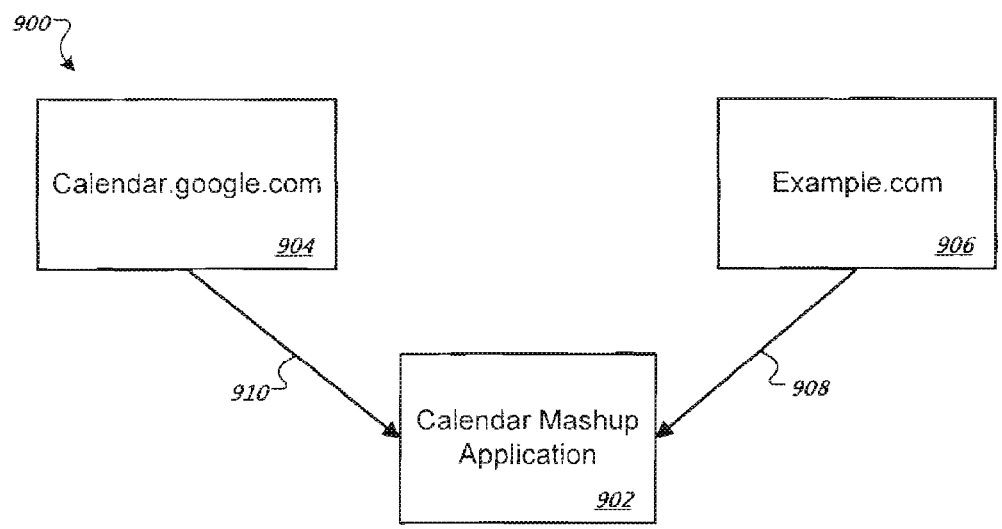
FIG. 9 is a box diagram showing an exemplary relationship between a browser-based application, a service provider, and a web site hosting the browser-based application.

FIG. 9 is a box diagram 900 showing an exemplary relationship between a browser-based application 902, a data provider 904, and a relying party 906 hosting a browser-based application. In this example, the browser-based application 902 can be at least partially defined by code hosted on the relying party 906. An arrow 908 indicates this relationship. For example, the code can include Visual Basic Scripting Edition (VBScript) that defines the user interface elements and logic used by the application 902. In FIG. 8, the code specifies that the calendar mashup application 902 display one week of calendar events starting on Mar. 29, 2004.

In the example of FIG. 9, data used by the browser-based application 902 is retrieved from the data provider 904, as indicated by an arrow 910. For example, subject to authorization from the user, the calendar mashup application 802 of FIG. 8, can request and retrieve a user's calendar data from GOOGLE calendar (whose URL is: calendar.google.com). The user's calendar data, for example, can be displayed as shown in FIG. 8.

Figure 10:
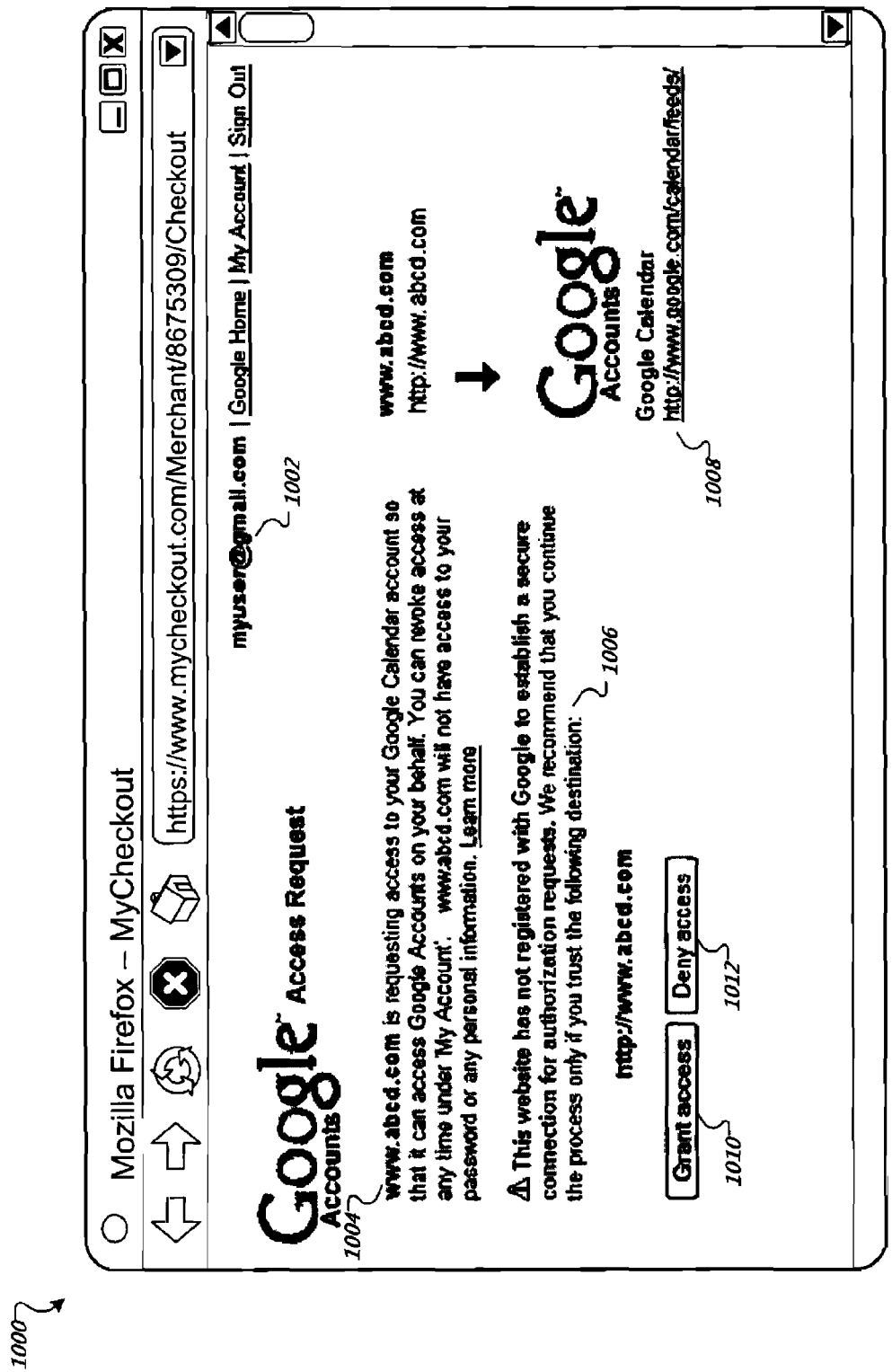
FIG. 10 is an exemplary screenshot of a web page presented to a user to request permission to share data or other services with a third-party application.

FIG. 10 is an exemplary screenshot of a web page 1000 presented to a user to request permission to share data or other services with a third-party application. In some implementations, the web page 1000 is an example of a login page described previously. If a browser-based application requests a service that it is not authorized to initiate, the data provider can present a login page, such as the web page 1000, to a user.

In this example, the web page 1000 displays a username as an indicator 1002 that the user is already signed into the data provider. The client can store a cookie that is used to authenticate the user when a user visits the web page 1000. In some implementations, this may bypass the act of entering a username and password when directed to the web page 1000. For example, the user may have entered the username and password at a previous time (e.g., to access the user's calendar or e-mail data stored at the data provider). In some implementations, once entered the data provider can assign a cookie, which can be used to verify that the user is signed into the data provider. The cookie can then be used to infer or indicate a username and password.

In some implementations, the web page 1000 can display the domain of the application that is requesting access to the service provider. For example, the web page 1000 can include an alert 1004 that states the domain www.abcd.com is requesting access to the user's GOOGLE Calendar account.

In some implementations, the web page 1000 can display messages relating to the browser-based application or domain requesting the service from the data provider. For example, an alert 1006 states that the domain www.abcd.com is not pre-registered with the data provider and that the user should only grant access to the user's data if the user trusts the browser-based application hosted at that domain.

In certain implementations, the web page 1000 displays the particular resource the browser-based application is attempting to access. For example, the web page 1000 lists GOOGLE Calendar http://www.google.com/calendar/feeds/ as the resource that the browser-based application hosted by www.abcd.com is attempting to access.

The web page 1000 can also include an interface element that permits the user to grant access or deny access to the listed service via the listed domain, or web site. For example, the web site 1000 includes a grant access button 1010 and a deny access button 1012. If the user wishes to grant access to the browser-based application running on www.abcd.com, the user can select the grant access button 1010. Alternatively, if the user wishes to deny access, the user can select the deny access button 1012.

Figure 11:
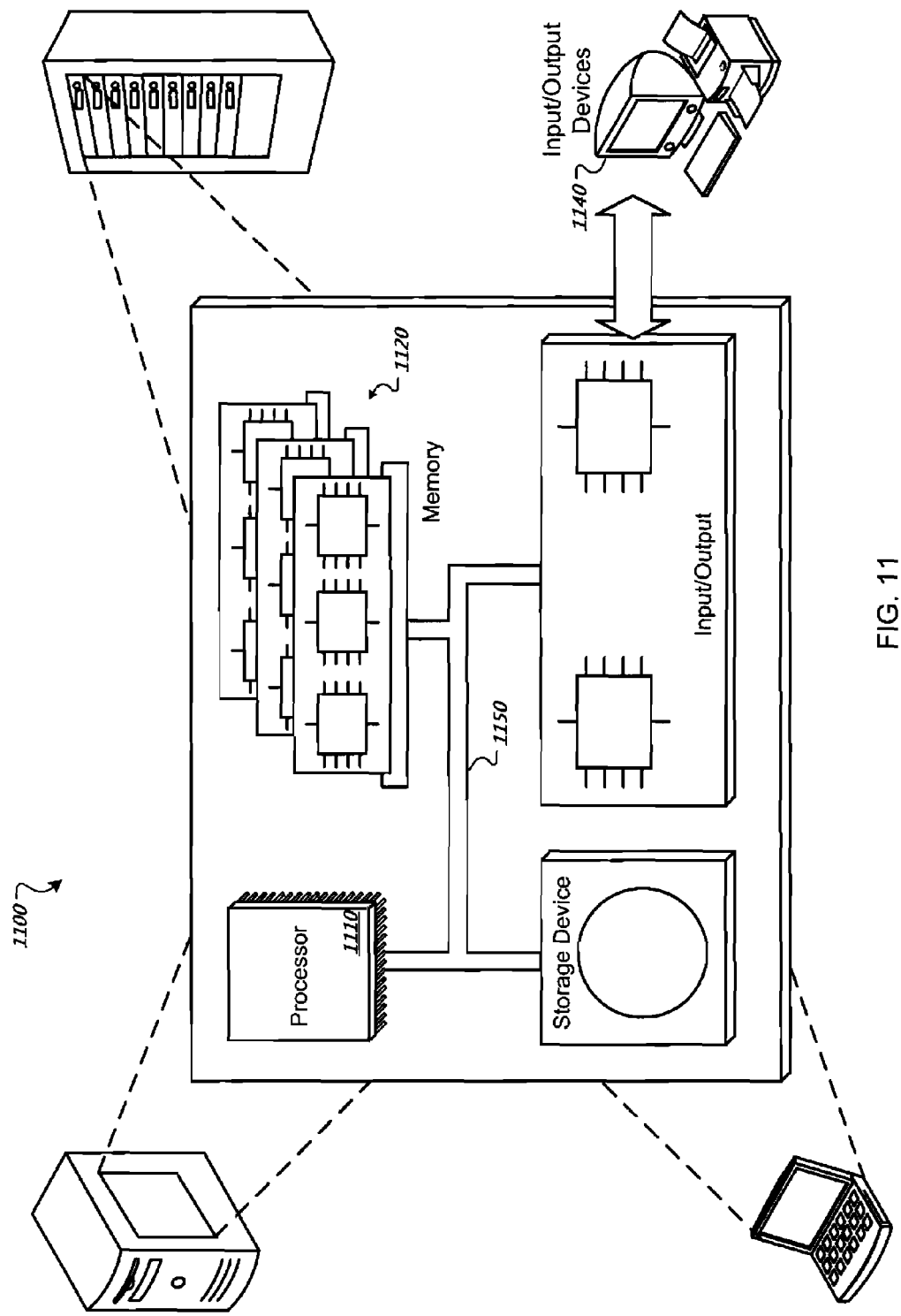
FIG. 11 is a schematic of a general computing system.

FIG. 11 is a schematic of a general computing system 1100. The system 1100 can be used for the operations described in association with any of the computer-implement methods described previously, according to one implementation. The system 1100 is intended to include various forms of digital computers, such as laptops, desktops, workstations, personal digital assistants, servers, blade servers, mainframes, and other appropriate computers. The system 1100 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 1100 includes a processor 1110, a memory 1120, a storage device 1130, and an input/output device 1140. Each of the components 1110, 1120, 1130, and 1140 are interconnected using a system bus 1150. The processor 1110 is capable of processing instructions for execution within the system 1100. The processor may be designed using any of a number of architectures. For example, the processor 1110 may be a CISC (Complex Instruction Set Computers) processor, a RISC (Reduced Instruction Set Computer) processor, or a MISC (Minimal Instruction Set Computer) processor.

In one implementation, the processor 1110 is a single-threaded processor. In another implementation, the processor 1110 is a multi-threaded processor. The processor 1110 is capable of processing instructions stored in the memory 1120 or on the storage device 1130 to display graphical information for a user interface on the input/output device 1140.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 may be a floppy disk device, a hard disk device, an optical disk device, or a tape device.

The input/output device 1140 provides input/output operations for the system 1100. In one implementation, the input/output device 1140 includes a keyboard and/or pointing device. In another implementation, the input/output device 1140 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them.

The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, in some implementations, a user can specify that an authorization agent should grant tokens of varying scope automatically for a particular relying party even if a particular scope has not been previously authorized.

In some implementations, the authorization agent may automatically grant future requests associated with a relying party if a user has authorized a predetermined number of past requests. For example, the authorization agent can determine that explicit user approval is not required if a threshold amount of tokens associated with a relying party is exceeded. In some implementations, the automatic token approval can occur for a relying party regardless of the scope of the requested token.

For example, a user has approved twenty tokens of various scopes for www.mashup.com. The threshold amount can be set to twenty. Therefore, if a user has approved www.mashup.com's requests for tokens twenty times, the request for the twenty-first token can automatically occur even if the scope of the token request lies outside the scope of any of the previously issued tokens. A user can select whether to enable this feature.

In some implementations, automatic token approval can occur for tokens requested by relying parties within the same domain name. For example, if a relying party "www.greatmashup.com/first_application" is granted a token, then a relying party www.greatmashup.com/second_application can be automatically granted a token for the same scope because both relying parties are within the same domain "www.greatmashup.com." A user can select whether to enable this feature.

In another implementation, a token can be automatically granted to a first relying party without a user's explicit authorization if the same scope has been granted to one or more other relying parties. For example, the request for token 416 can request access to a user's contact information for a first relying party. The authorization agent 402 may reissue the token to the different relying party based on the user's previous willingness to share the contact information. In some implementations, the scope may only be automatically granted if the user has previously approved the scope to a predetermined number of other relying parties. For example, if the user has approved sharing contact information with 10 out of 10 relying parties that have requested the data, the authorization agent can automatically grant a token to new relying parties that request this information.

In another implementation, a token can be granted if a requested scope is substantially the same or is a subset of a combination of one or more scope(s) associated with previously issued tokens. For example, the requested scope may request access to a user's email and calendar data. A first previously granted token may include a scope authorizing access to the user's email, and a second previously granted token may include a scope authorizing access to the user's calendar data. The requested token can be granted based on a combination of scopes from the first and second previously granted tokens.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, at a computer system, a request from a web browser for a token that authorizes a third party server to access a user's data stored by a content provider server;
identifying, using the computing system and from a plurality of available scopes of authorization stored on the computing system, a first scope of authorization that is specified by the token and that indicates a portion of the user's data that a third party server is permitted to access, wherein the first scope of authorization indicates part of the user's data but less than all of the user's data;
identifying a previously-issued token;
identifying a second scope of authorization from the plurality of scopes of authorization, the second scope of authorization specified by the previously-issued token;
comparing, using the computer system, the first scope of authorization to the second scope of authorization; and
transmitting the token in response to the received request based on a determination that the first scope of authorization is determined to be a subset of the second scope of authorization.

2. The computer-implemented method of claim 1, wherein determining if the first scope is the same as or a subset of the second scope comprises determining if the portion of the user's data specified by the first scope is the same as or a subset of a second portion of the user's data specified by the previously issued token.

3. The computer-implemented method of claim 1, wherein the first scope further indicates activities that the third party server is permitted to perform in association with the indicated portion of the user's data.

4. The computer-implemented method of claim 3, wherein determining if the first scope is the same as or a subset of the second scope comprises determining whether the activities specified by the first scope are the same as or a subset of activities previously authorized by the second scope.

5. The computer-implemented method of claim 1, wherein the web browser requesting the token is different from a second web browser that received the previously issued token.

6. The computer-implemented method of claim 1, further prompting a user of the web browser to approve the first scope of the token if the first scope is not the same as or a subset of the second scope.

7. The computer-implemented method of claim 6, wherein prompting the user to approve the first scope comprises presenting the user with information associated with the third party server, the portion of the user's data to be accessed, activities to be performed on the portion of the user's data, or a combination thereof.

8. The computer-implemented method of claim 1, further comprising issuing a new token if the first scope is not the same as or a subset of the second scope and if a user authorizes the first scope.

9. The computer-implemented method of claim 8, further comprising determining that the user has not exceeded a predetermined amount of allowed tokens before issuing the new token.

10. The computer-implemented method of claim 1, wherein tokens comprise web browser cookies.

11. The computer-implemented method of claim 1, wherein the token comprises the previously issued token.

12. The computer-implemented method of claim 11, further comprising obfuscating the previously issued token.

13. The computer-implemented method of claim 12, wherein obfuscating comprises hashing information associated with the previously issued token using a randomly generated number.

14. The computer-implemented method of claim 11, further comprising receiving permission from a user to allow previously issued tokens to be reissued in response to requests for tokens.

15. The computer-implemented method of claim 1, wherein an authorizing server receives the request for the token.

16. The computer-implemented method of claim 15, wherein the content provider server comprises the authorizing server.

17. The computer-implemented method of claim 1, wherein the third party server hosts mashup applications or hypertext markup language (HTML) and JavaScript miniapplications served in iFrames that access the user's data.

18. The computer-implemented method of claim 1, further comprising determining if the first scope is the same as or a subset of a combination of the second scope with one or more additional scopes of one or more additional previously issued tokens.

19. The computer-implemented method of claim 18, wherein transmitting the token comprises transmitting the previously issued token or the one or more additional previously issued tokens in response to the request for the token.

20. The computer-implemented method of claim 18, further comprising reformatting the previously issued token or the one or more additional previously issued tokens into a single cookie.

21. The computer-implemented method of claim 1, wherein the third party server prompts the web browser to transmit the request for the token.

22. The computer-implemented method of claim 1, further comprising determining if a user has previously authorized issuance of tokens to the third party server a predetermined number of times.

23. The computer-implemented method of claim 22, further comprising transmitting the token in response to the received request if the user previously authorized the third party server the predetermined number of times regardless of the first scope associated with the token.

24. The computer-implemented method of claim 1, further comprising receiving a request from a user to revoke or reauthorize a permission to transmit the token in response to the received request if the first scope is determined to be the same as or a subset of the second scope.

25. A system comprising:
a computer interface to receive from a web browser a request for a token that authorizes a third party to access a user's data, wherein the computer interface identifies a first scope of authorization from a plurality of scopes of authorization stored on the computing system, the first scope of authorization being specified by the token and indicating a portion of the user's data that a third party server is permitted to access, wherein the first scope of authorization indicates part of the user's data but less than all of the user's data, and wherein the computer identifies a previously-issued token and a second scope of authorization from a plurality of authorization scopes, the second scope of authorization specified by the previously-issued token;
means for comparing the first scope of authorization to the second scope of authorization; and
a token issuer to transmit the token in response to the received request based on a determination that the first scope of authorization is determined to be equal to or less than the second scope of authorization.

\* \* \* \* \*

UNITED STATES PATENT AND TRADEMARK OFFICE
CERTIFICATE OF CORRECTION

| | | |
|---|---|---|
| PATENT NO. | : 8,793,509 B1 | Page 1 of 1 |
| APPLICATION NO. | : 12/030095 | |
| DATED | : July 29, 2014 | |
| INVENTOR(S) | : Jeffrey Nelson et al. | |

It is certified that error appears in the above-identified patent and that said Letters Patent is hereby corrected as shown below:

On the Title Page:

Column 1, Item (75) line 3, delete "Mark B. Stahl" and insert -- Mark E. Stahl --, therefor.

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,793,509 B1 | Page 1 of 1 |
| APPLICATION NO. | : 12/030095 | |
| DATED | : July 29, 2014 | |
| INVENTOR(S) | : Nelson et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1317 days.

Signed and Sealed this
Twenty-ninth Day of December, 2015

Michelle K. Lee
*Director of the United States Patent and Trademark Office*